United States Patent [19]
Groberman et al.

[11] 3,715,920
[45] Feb. 13, 1973

[54] APPARATUS FOR DETERMINING THE DAMPING RATIO OF A SECOND ORDER VIBRATION SYSTEM

[75] Inventors: Leslie J. Groberman, Minneapolis; Edward R. Wuori, St. Paul, both of Minn.

[73] Assignee: Honeywell Inc., Minneapolis, Minn.

[22] Filed: April 20, 1971

[21] Appl. No.: 135,785

[52] U.S. Cl. ............................73/194 B, 73/67.1
[51] Int. Cl. .......................................G01f 1/00
[58] Field of Search.........73/194, 228, 67.2, 517, 59, 73/194 B, 194 M, 99, 67.1

[56] References Cited

UNITED STATES PATENTS

| | | | |
|---|---|---|---|
| 1,935,445 | 11/1933 | Heinz | 73/194 |
| 2,358,374 | 9/1944 | Ashcraft | 73/32 |
| 2,741,918 | 4/1956 | Boisblanc | 73/194 |
| 3,176,505 | 4/1965 | Hendrickson | 73/67.2 |
| 3,218,851 | 11/1965 | Sipin | 73/194 |
| 3,313,148 | 4/1967 | Dautreppe et al. | 73/99 |
| 3,426,593 | 2/1969 | Jacobs | 73/194 |
| 3,501,952 | 3/1970 | Gergen et al. | 73/67.2 X |
| 3,508,437 | 4/1970 | Van Beek | 73/67.2 |

Primary Examiner—Richard C. Queisser
Assistant Examiner—John P. Beauchamp
Attorney—Charles J. Ungemach, Albin Medved and James A. Phillips

[57] ABSTRACT

Apparatus for measuring the damping ratio of a second order system. The apparatus takes the form of a mass rate flow meter comprising an impact plate adapted to be inserted in a fluid flow. The plate and its mounting means forms a second order system which has a damping ratio proportional to the rate of mass flow. The plate is connected in a loop with an integrator, or a differentiator, and a multiplier. The integrator of differentiator provides, among other things, phase shifting. The loop gain is increased until the loop oscillates. Automatic gain control stabilizes the oscillations and the amplitude of the loop oscillations is compared with a reference quantity. The signal resulting from this comparison is used to adjust the gain of the multiplier such that the amplitude of the loop oscillations is kept constant. The signal used to adjust the gain of the multiplier is proportional to the damping ratio of the second order system and therefore is also proportional to the mass flow rate.

7 Claims, 5 Drawing Figures

INVENTORS
EDWARD R. WUORI
LESLIE J. GROBERMAN
BY Charles J. Ungemach
ATTORNEY

APPARATUS FOR DETERMINING THE DAMPING RATIO OF A SECOND ORDER VIBRATION SYSTEM

FIELD OF THE INVENTION

The invention comprises an apparatus for measuring the damping ratio of a second order system. In a specific application the apparatus takes the form of a mass rate flow meter wherein the damping ratio of the flow meter is proportional to the mass flow rate.

SUMMARY

The invention is an apparatus for measuring the damping ratio of any second order system. In the operation of the apparatus a signal is developed which is directly proportional to the damping ratio. A second order system has a Laplace transfer function with two poles in the complex plane. In this invention an element providing either a third pole or a zero is added in a loop with the second order system and a multiplier and the gain of the loop is adjusted by adjusting the gain of the multiplier until the loop oscillates. The multiplier included in the oscillating loop also forms a part of an automatic gain control (agc) loop. The agc loop controls the damping ratio of the oscillating loop by controlling the gain of the multiplier, allowing the oscillations to build up to a predetermined amplitude and maintaining them at this amplitude. In this way the oscillating loop is artificially sustained at zero damping ratio. The signal developed in the agc loop is a linear function of the damping ratio. The agc loop comprises an amplitude detector and a comparator in addition to the multiplier. The multiplier is common to the oscillating loop and the agc control loop. The detector provides a signal proportional to the amplitude of the loop oscillations which is compared in the comparator with an amplitude reference signal. The comparator develops the agc signal which is directly proportional to the damping ratio of the second order system. The agc signal controls the gain of the multiplier which controls the gain of the oscillating loop.

In a specific form of the invention the second order system is a mass rate of flow meter having damping directly proportional to the rate of flow of a mass. Therefore, the agc signal, which is directly proportional to the damping ratio, is also directly proportional to the rate of flow of the mass which is the quantity which it is desired to measure.

It is standard practice in control systems, such as autopilots, to determine "equivalent damping ratio" and "equivalent natural frequency" of very high order systems (even up to 30 or 40 poles). This results in an equivalent second order characterization (approximate) of the system. The apparatus of this disclosure could be used to make such determinations in certain cases.

DESCRIPTION

Figure 1:
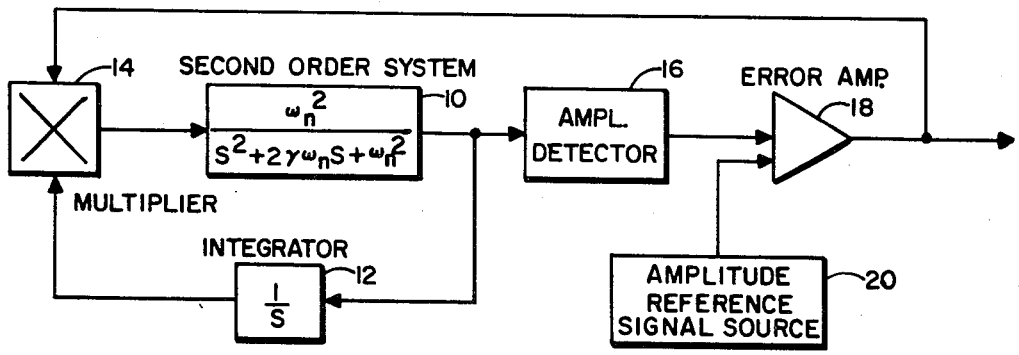
FIG. 1 is a functional block diagram of the method for determining the damping ratio of a second order system.

FIG. 1 illustrates a method of measuring the damping ratio of a second order system. The method results in the generation of a signal which is directly proportional to the damping ratio and therefore the method can be called linear. The Laplace transfer function of a second order system is $\omega_n^2/(s^2+2\gamma\omega_n s+\omega_n^2)$ where $\omega_n$ is the natural frequency of the system and $\gamma$ is the damping ratio. The second order system has two poles. In the method of the invention shown in FIG. 2 a third pole having a Laplace transform of the general form $1/s$ is added to the second order system forming a loop with it and an multiplier. The gain of the multiplier and hence the gain of the loop is increased until the root locus of the resulting third order system crosses the imaginary axis in the complex plane. When this occurs oscillations will start building up. The third pole is added by an integrator 12 which together with a multiplier 14 forms a loop with a second order system 10. An automatic gain control loop comprises an amplitude detector 16, an error amplifier 18, and multiplier 14, which operates to allow the oscillations to build up to a predetermined amplitude. The agc loop establishes the gain of multiplier 14 which in turn controls the gain of the oscillating loop so that the oscillations are stable, i.e., the oscillating system is artificially sustained at zero damping ratio. Amplitude detector 16 develops a signal directly proportional to the amplitude of the oscillations. This signal and a signal from an amplitude reference signal source 20 are compared in amplifier 18 which develops an agc signal that is applied to multiplier 14. In this way the gain of multiplier 14 and, therefore, the gain of the oscillating loop are controlled. The gain of the oscillating loop is controlled such that oscillations are constant and uniform. This gain is a linear function of the damping ratio. Furthermore the agc signal is equivalent to this gain and provides a direct measure of it.

The gain as represented by the agc signal is a linear function of the damping ratio. The root locus equation for a second order system with an integrator in the feedback loop is:

$$A'\omega_n^2/s(s^2+2\gamma\omega_n s+\omega_n^2) = -1$$

or $$s^3+2\gamma\omega_n s^2+\omega_n^2 s+A'\omega_n^2 = 0$$

where $A'$ is the loop gain. For $s = j\omega$, the condition for oscillation, both real and imaginary parts of the last equation must simultaneously vanish. It can be shown that this can occur only if $\omega = 0$ or $\omega = \omega_n$. By substituting these frequencies back into the last equation it can be shown that for $\omega = 0$, $A' = 0$ and for $\omega = \omega_n$, $A' = 2\omega_n\gamma$. Since $A' = 0$ is not allowed by the automatic gain control loop the system will operate at a frequency $\omega = \omega_n$ with a loop gain of $A' = 2\gamma\omega_n$. The multiplier 14 functions as a variable gain amplifier having a gain equal to A' which is equal to the agc control signal developed by amplifier 18. Hence the agc control signal is directly proportional to the damping ratio γ. The control signal may be used to drive an indicator (not shown) calibrated in terms of damping ratio or some other parameter which is a function of the damping ratio.

Figure 2:
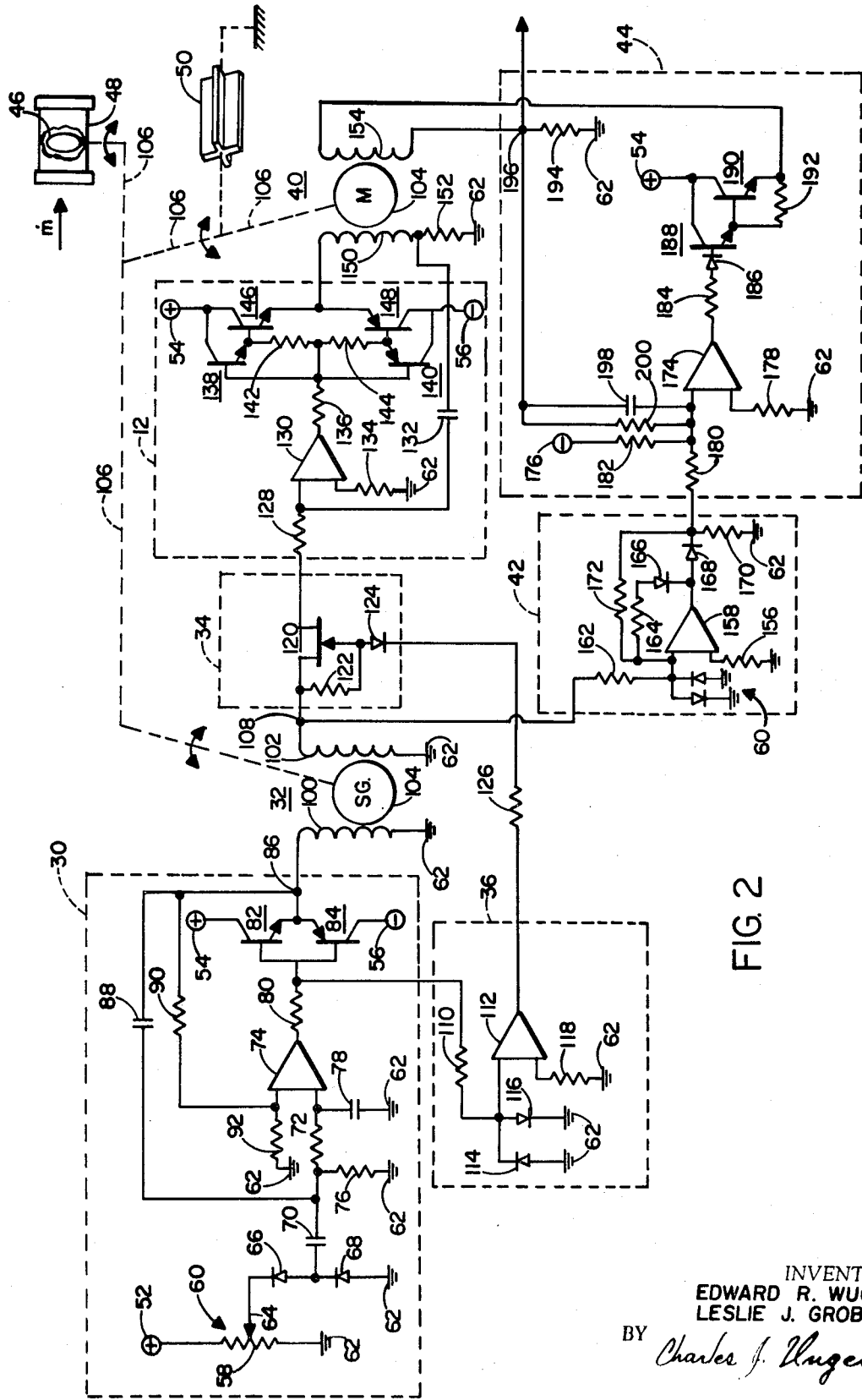
FIG. 2 is a schematic diagram of apparatus using the method and measuring the rate of flow of a mass.

FIG. 2 is a schematic diagram of apparatus designed in accordance with the method. The apparatus was designed to measure the mass rate of flow in a conduit, etc. The apparatus comprises an oscillator 30, a position-to-voltage transducer or signal generator 32, a phase sensitive demodulator 34, a demodulator-driver 36, integrator unit 12, a torque motor 40, a low level rectifier 42, a comparator 44, an impact vane 46 mounted in a section of conduit 48, and a quadrilever (a torsional spring) 50. Transducer 32, motor 40, vane 46, and quadrilever 50 comprise the second order system 10 shown in FIG. 1.

Oscillator 30 is provided with two sources of positive potential 52 and 54 and a source of negative potential 56. Source 52 is connected to one end of the resistance element 58 of a potentiometer 60. The other end of element 58 is connected to a reference potential 62 (ground). A pair of diodes 66 and 68, in series, are connected between ground and the wiper element 64 of potentiometer 60. These diodes are connected such that they are back-biased by the positive potential at wiper element 64. Connected to a terminal between diodes 66 and 68 is one plate of a capacitor 70. The other plate is connected to one end of a resistor 72, the other end of which is connected to the non-inverting input terminal of a difference amplifier 74. A resistor 76 is connected from a point between capacitor 70 and resistor 72 to ground. A capacitor 78 is connected from the non-inverting input terminal of amplifier 74 to ground. One end of a resistor 80 is connected to the output terminal of amplifier 74, the other end is connected to both base electrodes of junction transistors 82 and 84. Transistors 82 and 84 are opposite types. Transistor 82 in an NPN type and transistor 84 is a PNP type. The collector of transistor 82 is connected to the positive potential source 54 and the collector of transistor 84 is connected to the negative potential source 56. The emitter electrodes of transistors 82 and 84 are tied together and connected to a terminal 86 which serves as the output terminal of oscillator 30. A feedback capacitor 88 is connected between terminal 86 and a point between capacitor 70 and resistor 72. A feedback resistor 90 is connected between terminal 86 and the inverting input terminal of amplifier 74. A resistor 92 is connected from the inverting input terminal of amplifier 74 to ground. In the particular system of FIG. 2 oscillator 30 was designed to provide a signal of 10 kilocycles per second. The amplitude of the oscillator output is varied by adjusting potentiometer 60. Although a particular oscillator design is shown and described the specific design is not important and many other kinds of oscillators may be used and are well known to those skilled in the electronics field.

Oscillator 30 supplies a 10KC signal to the transducer 32 and the demodulator-driver 36. The signal supplied to the transducer is provided at output terminal 86. The signal supplied to the demodulator-driver is provided at the base electrodes of transistors 82 and 84.

The position-to-voltage transducer or signal generator 32 includes an input winding 100, an output winding 102, and a rotor 104. Rotor 104 is mounted on a shaft 106 which is shown as a dashed line. Input winding 100 is connected between oscillator output terminal 86 and ground. Output winding 102 is connected between a terminal 108 and ground. The 10KC signal at the input winding 100 acts as a carrier signal. The signal developed by transducer 32 and appearing across output winding 102 is the 10KC carrier signal amplitude modulated in accordance with the position of rotor 104. The system shown in FIG. 2 was designed to oscillate at a frequency of about 150 cycles per second so that rotor 104 is oscillating about a central position at a rate of 150 cycles per second. The position of rotor 104 is either positive or negative with respect to its central position (except of course when it is passing through the central position). The phase of the output signal developed across winding 102 depends upon the position of rotor 104. In effect, the 10KC signal changes phase in accordance with the position of rotor 104 with respect to its center position. It is because of these changes in phase introduced by transducer 32 that phase sensitive demodulator 34 is required.

Demodulator-driver 36 includes a difference amplifier 112. A resistor 110 is connected between the base electrodes of transistors 82 and 84, in oscillator 30, and the inverting input terminal of amplifier 112. In this way demodulator-driver 36 is supplied with a 10KC signal from oscillator 30. A pair of parallel diodes 114 and 116 is connected between the inverting input terminal of amplifier 112 and ground. When the potential at the inverting input terminal of amplifier 112 becomes sufficiently negative with respect to ground, diode 114 conducts, and when it becomes sufficiently positive, diode 116 conducts. Diodes 114 and 116 operate as clippers, clipping the sinusoidal signal supplied by oscillator 30. A resistor 118 is connected between ground and the non-inverting input terminal of amplifier 112.

The amplitude modulated carrier signal developed across output winding 102 of transducer 32 is supplied to the phase sensitive demodulator 34 and the low level rectifier 42. Terminal 108 associated with winding 102 is connected to the source electrode of a field effect transistor 120 in demodulator 34. A resistor 122 is connected between the source and gate electrodes of transistor 120. A diode 124 and a series resistor 126 are connected between the gate electrode of transistor 120 and the output terminal of amplifier 112 in demodulator-driver 36. The anode of diode 124 is connected to the gate electrode of transistor 120. Thus, when the output of amplifier 112 goes negative diode 124 tends to be forward biased and a negative going signal is applied to the gate electrode of transistor 120 turning it off. That is, if the gate electrode of transistor 120 is negative there is a relatively high resistance between the source and drain electrodes of the transistor. Transistor 120 is then acting like a switch that is open. By periodically opening and closing the switch, that is transistor 120, the input signal to the switch, developed across winding 102, is phase demodulated. The output of demodulator 34, present at the drain electrode of transistor 120, is a series of periodic pulses. The frequency of the pulses is 10KC and the amplitude of the individual pulses corresponds to the instantaneous position of rotor 104 in transducer 32. The pulses have a polarity depending upon the position of rotor 104 with respect to its center position. The signal developed by demodulator 34 and present at the drain electrode of transistor 120 is supplied to integrator unit 12.

Integrator 12 includes a resistor 128, a difference amplifier 130, and a capacitor 132. Resistor 128 is connected between the drain electrode of transistor 120 in demodulator 34 and the inverting input terminal of difference amplifier 130. A resistor 134 is connected between the non-inverting terminal of amplifier 130 and ground. One end of a resistor 136 is connected to the output terminal of amplifier 130 and the other end of the resistor is connected to both base electrodes of junction transistors 138 and 140. Transistor 138 is an NPN type and transistor 140 is a PNP type. The collector of transistor 138 is connected to the source of positive potential 54 and the collector of transistor 140 is connected to the source of negative potential 56. Resistors 142 and 144 are connected between the emitter and base electrodes of transistor 138 and 140 respectively. The emitter electrodes of transistors 138 and 140 are connected to the base electrodes of transistors 146 and 148 respectively. Transistor 146 is an NPN type and transistor 148 is a PNP type. The collector of transistor 146 is connected to the source of positive potential 54 and the collector of transistor 148 is connected to the source of negative potential 56. The emitters of transistors 146 and 148 are tied together at a common junction point which is connected to one side of a winding 150 in torque motor 40. A resistor 152 is connected from the other side of winding 150 to ground. Capacitor 132 is connected from a point between winding 150 and resistor 152 to the inverting input terminal of amplifier 130.

Torque motor 40 includes, in addition to winding 150, another winding 154 and rotor 104. It should be noted that rotor 104 is common to torque motor 40 and transducer 32. The torque developed by motor 40 is proportional to the product of the signals associated with windings 150 and 154. In this sense, torque motor 40 is a multiplier. An example of a torque motor is shown in U. S. Pat. No. 2,488,734. Honeywell Inc., the assignee of the present invention also makes a torque motor called a Dualsyn which can be used.

In addition to being processed by demodulator 34, the signal developed by transducer 32 is supplied to the low level rectifier 42. Rectifier 42 functions as an amplitude detector providing an output signal which is proportional to the amplitude of the input signal. Terminal 108, associated with the output winding 102 of transducer 32, is connected to one end of a resistor 162. The other end of resistor 162 is connected to the inverting input terminal of a difference amplifier 158. A diode network 160 is connected between the inverting input terminal of amplifier 158 and ground. The diodes in network 160 are in parallel and are connected such that when one is forward biased the other is reverse biased. A resistor 156 is connected between the non-inverting input terminal of amplifier 158 and ground. A series circuit comprising a resistor 164 and a diode 166 is connected between the inverting input terminal and the output terminal of amplifier 158. The cathode electrode of diode 166 is connected to the output terminal of amplifier 158. Another series circuit comprising a diode 168 and a resistor 170 is connected from the output terminal of amplifier 158 to ground. The anode electrode of diode 168 is connected to the output terminal of amplifier 158. A resistor 172 is connected from the inverting input terminal of amplifier 158 to a point between diode 168 and resistor 170. This point serves as the output terminal of rectifier 42.

The positive potential signal developed by rectifier 42 and present at its output terminal is applied to comparator 44. Comparator 44 includes a difference amplifier 174 having non-inverting and inverting input terminals and an amplitude reference signal source 176. The non-inverting input terminal of amplifier 174 is connected to ground by a resistor 178. The inverting input terminal of amplifier 174 is connected to the output terminal of rectifier 42 by a resistor 180 and is connected to reference source 176 by a resistor 182. The junction between resistors 180 and 182 is a summing junction. There is present at this junction the algebraic sum of the output signal of rectifier 42 and the amplitude reference signal of source 176. The output terminal of amplifier 174 is connected to the base electrode of a junction transistor 188 by a resistor 184 and a diode 186 in series. Diode 186 is connected such that current flows into the base electrode of transistor 188 when the output terminal of amplifier 174 is positive. The collector electrode of transistor 188 is connected to the positive potential source 54. The emitter of transistor 188 is connected to the base of a transistor 190. A resistor 192 is connected between the base and emitter electrodes of transistor 190. Transistors 188 and 190 are of the NPN type. The emitter electrode of transistor 190, which forms the output terminal of comparator 44, is connected to one end of winding 154 in torque motor 40. The other end of winding 154 is connected to ground by a resistor 194. The output signal of the system is developed across resistor 194 and appears at an output terminal 196 between winding 154 and resistor 194. A feedback network comprising a capacitor 198 and a parallel resistor 200 is connected between output terminal 196 and the inverting input terminal of amplifier 174. The purpose of this network is to provide negative feedback with respect to any 10KC signal components present at the inverting input terminal of amplifier 174.

Figure 3:
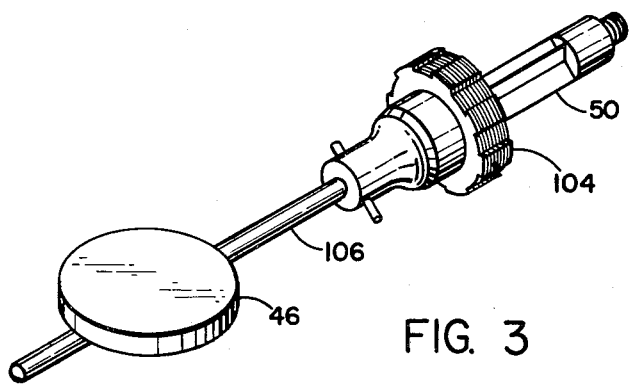
FIG. 3 is a view of a vane and its mounting means used in the apparatus of FIG. 2.

The second order system comprising rotor 104, shaft 106, etc., is shown in its actual form in FIG. 3.

The flow meter system of FIG. 2 includes a second order system. Impact plate 46, shaft 106 and quadrilever 50 comprise the second order system. Rotor 104 may be considered to be merely an extension of shaft 106. Transducer 32 and torque motor 40 need not be considered as elements of the second order system. Transducer 32 merely provides a signal indicative of the position of vane 46 and motor 40 merely provides a torque necessary to keep vane 46 oscillating in a steady state. In addition to supplying a sufficient amount of torque, motor 40 must supply a torque of the proper phase in order to sustain the oscillations of impact plate or vane 46.

For proper phasing the net phase shift around the loop including the second order system must be zero. The loop includes the second order system made up of vane 46, shaft 106, and quadrilever 50, and transducer 32, demodulator 34, integrator 12, and torque motor 40. At the natural frequency of the second order system, the frequency at which the second order system oscillates, the phase shift of the second order system is −90°. The phase shift associated with the integrator unit 12 is also −90°. This means that another −180° must be picked up in the loop. This can be easily done for example by reversing a lead pair somewhere in the loop, e.g., winding 102 or winding 50. Thus, if as the gain of the loop is increased the second order system does not oscillate the leads of winding 102 or winding 150 may be reversed. Obviously the leads of other elements in the loop may also be reversed to achieve the same effect. The gain of the loop is varied by varying the current flowing in winding 154 of motor 40. For example, if an increased mass flow rate impinges on impact plate 46 the amplitude of the oscillations of the plate will tend to decrease. The output signal of rectifier 42 will decrease which causes the inverting input terminal of amplifier 174 in comparator 44 to become negative. This means that the output terminal of amplifier 174 will become positive causing transistors 188 and 190 to increase in conduction and thereby increase the amount of current flowing through winding 154 in motor 40. In response to this increase of current the output torque of motor 40 is increased causing the amplitude of the oscillations of vane 46 to increase to the steady state operating value. It can be seen that rectifier 42, comparator 44, and winding 154 of motor 40, etc., operate as an agc loop maintaining the oscillations of the second order system constant. The integrator unit 12 provides two functions. The primary function is to provide a −90° phase shift. A secondary function is to filter out any component of the 10KC carrier signal present at the output of the demodulator 34. Transistors 138, 140, 146 and 148 function as a buffer or power amplifier. The function of the buffer is to provide a current source to drive winding 150. The current flowing in winding 150 must be kept constant with respect to the ambient temperature of the winding. A current source is desirable because the resistance of winding 150 varies slightly with temperature and the current from a voltage source therefore would vary.

Figure 4:
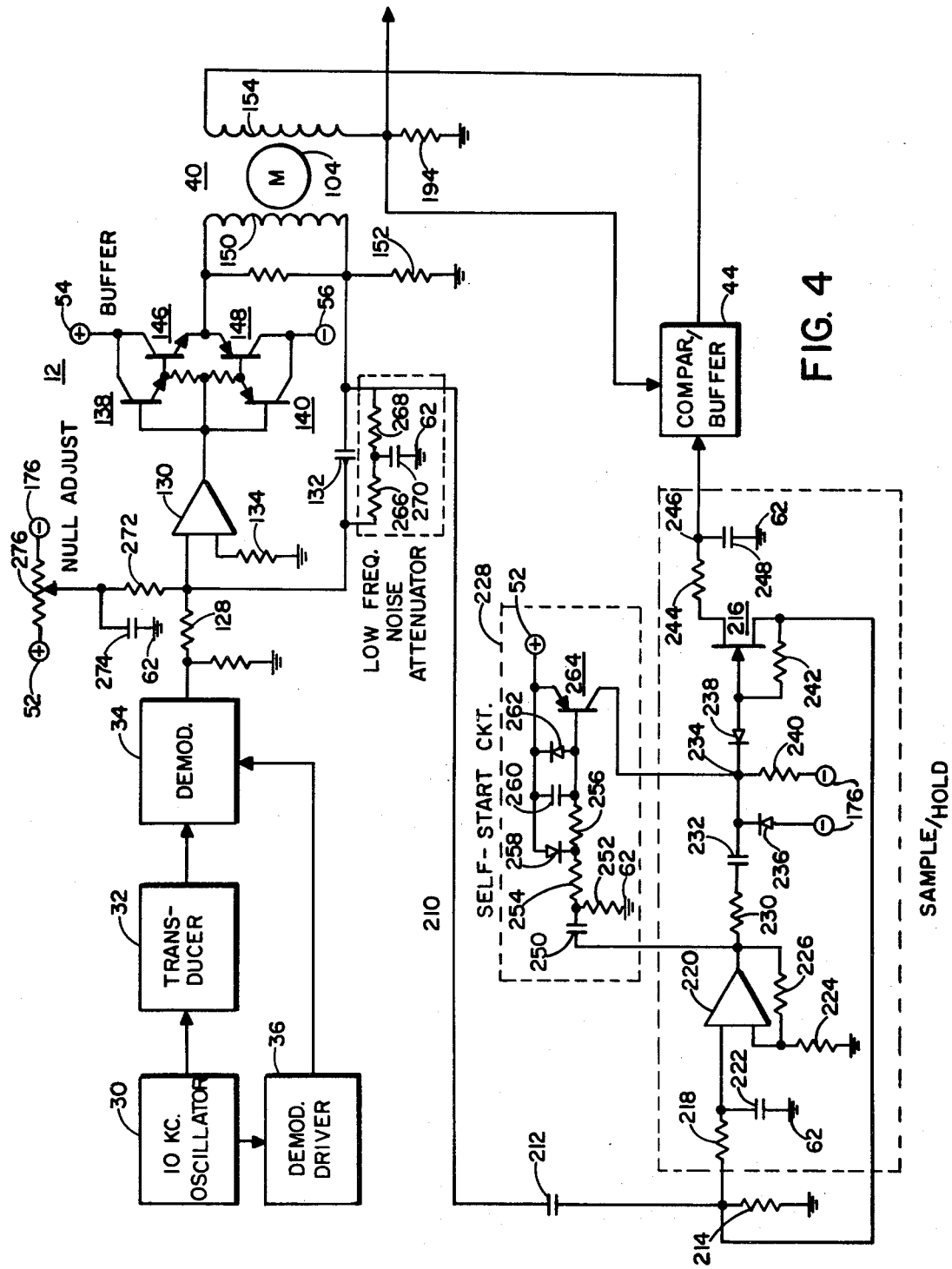
FIG. 4 is a schematic diagram of a mass rate flowmeter much like that shown in FIG. 2 except for the agc loop.

FIG. 4 is a schematic of a system which is similar in many ways to the system shown in FIG. 2. The main distinction between the two systems is that the system of FIG. 2 uses rectifier 42 to detect the peak amplitude of the oscillations whereas the system of FIG. 4 uses a sample and hold circuit. The sample and hold circuit is used for the same purpose as the rectifier circuit. Both circuits in effect detect the peak amplitude of the oscillations. The input signal to the sample and hold circuit is taken from the output of the integrator unit in FIG. 4 rather than from the output of the transducer 32 as is done in the system of FIG. 2. It should be noted that the input signal to rectifier 42 in FIG. 2 could just as well have been taken from the output of the integrator unit 12. The output signal from demodulator 34 could also be used in either case.

In FIG. 4 the output signal of integrator 12 is developed across resistor 152. This signal, by means of a lead 210, is applied to one side of a capacitor 212. The other side of capacitor 212 is connected to one side of a resistor 214 the other side of which is connected to ground. Capacitor 212 and resistor 214 form a high pass circuit for the signal which in this case is a sinusoid having a frequency of about 150 cycles per second. From a point between capacitor 212 and resistor 214 connection is made to the source electrode of a field effect transistor 216 and one side of a resistor 218. The other side of resistor 218 is connected to the inverting input terminal of a difference amplifier 220. Also connected to this input terminal is one side of a capacitor 222 the other side of which is connected to ground. A resistor 224 is connected between ground and the non-inverting input terminal of amplifier 220. The purpose of the circuit, made up of resistor 218 and capacitor 222, is to provide a 90° phase lag. The voltage developed across capacitor 222 lags the voltage across resistor 214 by 90°. The purpose of amplifier 220 is to square up the sinusoidal input signal. The output signal of amplifier 220 is a square wave having very sharp leading and trailing edges. Amplifier 220 also provides phase inversion. A resistor 226 is connected between the output terminal of amplifier 220 and its non-inverting input terminal.

The output of amplifier 220 is applied to the input of a self-start circuit 228 and also to one side of a resistor 230. The other side of resistor 230 is connected to one electrode of a capacitor 232, the other electrode of which is connected to a junction point 234. Connected to junction point 234 are the cathodes of diodes 236 and 238 and one end of resistor 240. The anode of diode 236 and the other end of resistor 240 are connected to the negative potential source 176. The anode of diode 238 is connected to the gate electrode of field effect transistor 216. A resistor 242 is connected between the gate and source electrodes of transistor 216. The drain electrode of transistor 216 is connected by means of a resistor 244 to a terminal 246 which forms the output terminal of the sample and hold circuit. Connected between output terminal 246 and ground is a holding capacitor 248. The purpose of the sample and hold circuit is to periodically charge capacitor 248 to the peak amplitude of the sinusoidal wave form at the output of integrator 12. Field effect transistor 216 conducts very briefly during intervals when the input signal to the sample and hold circuit is going through its peak value.

The output of amplifier 220 which supplies an input to self-start circuit 228 is applied to one side of capacitor 250, the other side of which is connected to a junction between a pair of resistors 252 and 254. The other end of resistor 252 is connected to ground and the other end of resistor 154 is connected to a junction between a resistor 256 and the cathode of a diode 258. The other side of resistor 256 is connected to one side of a capacitor 260, the anode of a diode 262, and the base electrode of a PNP junction transistor 264. The other side of capacitor 260, the anode of diode 258, the cathode of diode 262, and the emitter electrode of transistor 264 are returned to the positive potential source 52. The collector electrode of transistor 264 is connected to junction 234 in the sample and hold circuit. Whenever the output of amplifier 220 goes relatively positive a highly positive spike is developed at junction point 234 which causes transistor 216 to conduct between its source and drain terminals.

The self-start circuit 228 has an input from the output of amplifier 220. The purpose of self-start circuit is to detect if the amplifier 220 is switching properly. If amplifier 220 is switching properly, transistor 264 is maintained off, and has no effect on the sample-hold circuit operation. If the amplifier 220 ceases switching, the self-start circuit, after a short delay, turns transistor 264 on. When transistor 264 turns on, the potential at point 234 goes positive, and turns transistor 216 on. This has the effect of discharging capacitor 248 when certain conditions occur; that is, it is possible, without the self-start circuit, to get the circuit to stop oscillating and still have the capacitor 246 charged up. This can occur since the sample-hold circuit will stop sampling if the oscillations stop, so some means must be provided to discharge capacitor 62 when this happens.

The output of the sample and hold circuit is supplied to a comparator unit 44 in the same manner as shown in FIG. 2. The output of comparator 44 is applied to winding 154 of torque motor 40.

Connected in parallel with the integrating capacitor 132 is integrator unit 12 is a pair of series resistors 266 and 268. A capacitor 270 is connected from a junction point between resistors 266 and 268 to ground. Resistors 266 and 268 and capacitor 270 form a low frequency noise attenuator. Connected to the inverting input terminal of amplifier 130 in integrator 12 is one end of a resistor 272, the other end of which is connected to one electrode of a capacitor 274 and the wiper of a potentiometer 276. The other electrode of capacitor 274 is connected to ground and the ends of the resistance element of potentiometer 276 are connected to the positive potential source 52 and the negative potential source 176 respectively. Potentiometer 276 provides a null adjustment for amplifier 130.

The system of FIG. 4 operates in the same way as that of FIG. 2. The difference between the two systems occurs primarily in the automatic gain control loop wherein the system of FIG. 4 a sample and hold circuit is substituted for the rectifier 42 in the automatic gain control loop of the system of FIG. 2. With a sample and hold circuit the response time of the automatic gain control loop in FIG. 4 is faster than that of the system of FIG. 2.

Figure 5:
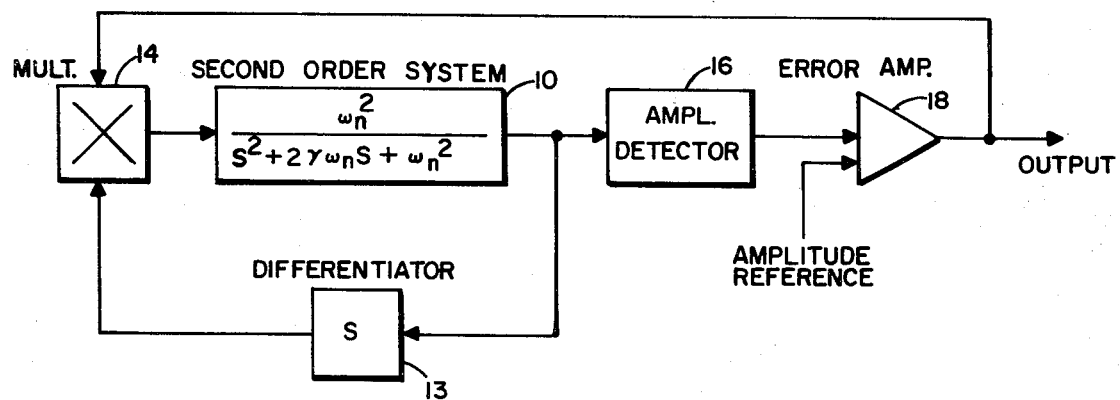
FIG. 5 is a functional block diagram of the method wherein a differentiating means is used in the oscillating loop instead of an integrating means as shown in FIG. 2.

Another form of the method of the invention is shown in FIG. 5. It is apparent that FIG. 5 is similar to FIG. 1 except that a differentiator 13 is used instead of integrator 12. The method illustrated by FIG. 5 also produces an output signal directionally proportional to the damping ratio $\gamma$. Differentiator 13 and multiplier 14 form a loop with the second order system 10. The gain of this loop is increased until the second order system begins oscillating. The gain of the loop is adjusted such that the second order system is artificially sustained at zero damping ratio and the oscillations are stabilized. The loop gain at which this occurs is a measure of the damping ratio $\gamma$. The output of the second order system 10 is detected by detector 16 which provides an output signal proportional to the amplitude of the loop oscillations. The oscillation amplitude is compared with a set point amplitude reference. The error between the amplitude of the loop oscillation and the set-point amplitude reference signal is amplified in amplifier 18 and used to control the loop gain. The output of amplifier 18 is applied to a second input of multiplier 14 and adjusts the gain of multiplier 14. In effect the aim of the method is to move the system poles to the imaginary axis and maintain them there. The output of error amplifier 18 corresponds to the loop gain and serves as the output signal.

The root locus equation for the above system is $1 + A\omega_n^2/(s^2+2\gamma\omega_n s+\omega_n^2) = 0$ where A is the loop gain. Clearing fractions in the last equation results in the equation $s^2+(2\gamma\omega_n+A\omega_n^2)s+\omega_n^2 = 0$. For $s = j\omega$, the condition for oscillation, the last equation becomes $\omega_n^2 -\omega^2+j(2\gamma\omega_n+A\omega_n^2)\omega = 0$. Setting both real and imaginary parts of the last equation equal to zero results in equations $\omega_n^2-\omega^2=0$ and $(2\gamma\omega_n+A\omega_n^2)\omega = 0$. The next to the last equation yields $\omega = \omega_n$ the frequency of oscillation. The other equation yields $A = -2\gamma/\omega_n$ which is the gain necessary for oscillation. The minus sign indicates that the initial assumption of negative feedback which was assumed in the way the root locus equation was written is wrong and that positive feedback is necessary.

The difference between the form of the method illustrated in FIG. 5 and that illustrated in FIG. 2 is the feedback element. In FIG. 5 a differentiator 13 forms the feedback element whereas in FIG. 2 an integrator 12 forms the feedback element. In each case the gain necessary for oscillation is directly proportional to the damping ratio $\gamma$. In the form of the method shown in FIG. 2 the gain is also directly proportional to the natural frequency whereas in the method of FIG. 5 the gain is inversely proportional to the natural frequency.

It should be noted that in general a lag circuit having a Laplace transform of the form $1/(\tau s+1)$ could be used instead of an integrator. As $\tau$ becomes very large $1/(\tau s +1)$ approaches $1/\tau s$ which represents an integrator with a gain of $1/\tau$. A lead circuit of the form $(\tau s+1)$ could be used instead of the differentiator. As $\tau$ becomes very large $(\tau s+1)$ approaches $\tau s$ which represents a differentiator with gain $\tau$. In this way an integrator or a differentiator can be approximated with a lag or lead circuit respectively.

In the flow meters shown in FIGS. 2 and 4 the natural frequency is $\omega_n=(k/I)^{1/2}$ where k is the spring constant and I is the inertia. The damping ratio in these flow meters is $\gamma = \text{const.}x\dot{m}/\sqrt{I} = B\dot{m}/\sqrt{I}$ where $\dot{m}$ is the flow rate and B is a calibration constant. The output of a system employing the method of FIG. 2, that is with an integrator, is $A'=2\gamma\omega_n=2Bk\dot{m}/\sqrt{I}$ which is a linear indication of flow rate m. It was discovered however that the inertia I varies somewhat with flow rate. This may cause a problem in the output linearity for the integrator feedback method shown in FIG. 2.

The output using a differentiator as shown in FIG. 5, however, is $A = 2\gamma/\omega_n = 2B\dot{m}/\sqrt{k}$. Note that the inertia terms cancel. The output is now directly proportional to $m$ independent of inertia. The only other distinction, and it is a minor one, is the phasing in the two forms of the method. In the method of FIG. 2 the integrator introduces a $-90°$ phase shift whereas in the method of FIG. 5 the differentiator introduces a $+90°$ phase shift. The second order system still has associated with it a $-90°$ phase shift at its natural frequency. If there are no other phase shifts in the form of the method shown in FIG. 5 the $-90°$ phase shift of the second order system is cancelled by the $+90°$ phase shift of the differentiator. Therefore, it is only necessary to reverse a lead pair in the system of FIG. 2 to arrive at proper phasing for the system of FIG. 5.

Although the invention is shown and described in connection with a flow meter it is apparent that the apparatus could be used in other applications. The apparatus is not to be limited to the specific application shown and described but is to be limited only by the claims.

What is claimed is:

1. Apparatus for determining the damping ratio of a second order system, the system having a symmetrical vane attached to a shaft mounted for oscillator movement about its longitudinal axis, the shaft including a torsional spring, the vane and shaft adapted to be mounted in a fluid flow, and the damping ratio of the second order system being a function of the mass flow rate, the second order system having a Laplace transfer function of the form $\omega_n^2/(s^2+2\gamma\omega_n s+\omega_n^2)$ where $\omega_n$ is the natural frequency of this system and $\gamma$ is the damping ratio, comprising:

a phase shifting network with a Laplace transform of the form $1/\tau s+1$ connected in a loop with the second order system, the resulting loop system having a root locus equation of the form $A'\omega_n^2/[(\tau s+1)(S^2+2\gamma\omega_n s+\omega_n^2)]=-1$ where $A'$ is the gain of the loop and $\tau$ is a time constant associated with the phase shifting network;

means for increasing the gain of the loop system until the root locus of the loop system crosses the imaginary axis in a complex number plane and oscillations are caused to build up in the second order system;

means for detecting the amplitude of the oscillations;

an amplitude reference signal;

means for comparing the detected amplitude with the amplitude reference signal and developing a signal proportional to the difference thereof; and, means for controlling the gain of the loop system with a difference signal, the difference signal being a measure of the damping ratio, including a motor means responsive to the difference signal and connected to the shaft for oscillating it.

2. The apparatus of claim 1 wherein the vane is a solid round disc with sharp edges.

3. Apparatus for determining the damping ratio of a second order system comprising:

means for oscillating the second order system and forming a first loop with the second order system, including means for developing a signal corresponding to the position of the second order system, comprising an oscillator having a frequency which is relatively high with respect to the natural frequency of the second order system, a transducer comprising a rotor connected to the second order system and a stator associated with the rotor and having first and second windings, the first winding energized by a signal by the oscillator, and a phase-demodulator connected to the second winding, the demodulator synchronized with the oscillator;

means for integrating the positional signal, the integrated positional signal being shifted in phase from the positional signal as a result of the integration;

motor means energized by the integrated signal and applying a corresponding torque to the second order system; and, means forming a second loop, directly responsive to the positional signal, for controlling the gain of the motor means and hence the gain of the first loop so that oscillations of the second order system are artificially sustained at zero damping ratio, including means for developing a signal proportional to the gain of the motor means and hence the gain of the first loop, the gain being proportional to the damping ratio of the second order system.

4. The apparatus of claim 3 wherein the means forming a second loop for controlling the gain of the first loop, comprises:

means for detecting the amplitude of the second order system oscillations;

an amplitude reference signal source;

means for comparing the detected amplitude with the reference signal and developing a control signal corresponding to the algebraic sum thereof, the control signal being applied to the motor means connected to the second order system, the motor means developing a torque and applying it to the second order system, the developed torque corresponding to the control signal.

5. The apparatus of claim 4 wherein the means for detecting the amplitude of the second order system oscillations is a rectifier circuit.

6. The apparatus of claim 4 wherein the means for detecting the amplitude of a second order system oscillations is a sample-and-hold circuit.

7. The apparatus of claim 6 and in addition a self-start circuit associated with the sample-and-hold circuit, the self-start circuit operating to cause a hold capacitor in the sample-and-hold circuit to be discharged if the second order system ceases to oscillate even temporarily.

* * * * *